Figure 1:
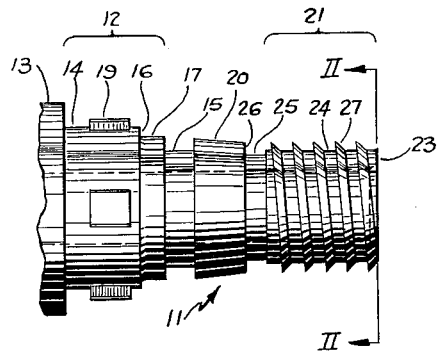

May 1, 1962 K. P. ROLSTON 3,032,358
HOSE COUPLING
Filed March 4, 1960

INVENTOR.
KENNETH P. ROLSTON
BY
ATTORNEY

United States Patent Office
3,032,358
Patented May 1, 1962

3,032,358
HOSE COUPLING
Kenneth P. Rolston, 2909 Bath Road, Bristol Township,
Bucks County, Pa.
Filed Mar. 4, 1960, Ser. No. 12,711
3 Claims. (Cl. 285—247)

This invention relates to hose couplings, concerning especially coupling means for providing a leakproof connection to hoses of various compositions and surface characteristics and regardless of appreciable variation in inside and outside diameter and wall thicknesses.

There are many variations of rubber and plastic hoses on the market, some of them reinforced with fabric or wire, for example. Such hoses are intended for a wide range of applications, including use as lawn or garden hose, and are found in shorter lengths in or connected to household appliances, such as washing machines for dishes or clothes. Such hoses are employed also in irrigation, spraying, and other agricultural uses, and in various industrial applications. Hoses represented as being a certain nominal size are subject to wide variation in actual inside and outside diameter and wall thicknesses, as well as in surface texture, resilience, and other physical characteristics dependent upon the component materials. One result of the many prevailing variations is that conventional couplings frequently fail to provide leakproof connections when used with such hoses.

Except where the cost of a coupling, however great, is obviously outweighed by a potential for economic loss or human injury if it should leak, as possible in certain industrial applications, the demand for a leakproof coupling is tempered by the reluctance of the average user to pay more for such a coupling than for one that appears equally satisfactory. Consequently, a purchaser is likely to get a coupling that will work satisfactorily for a little while, or with only a few limited types of hose, or one that leaks somewhat although it may not fail completely. For this reason, while leakproof couplings of relatively complex and expensive design may be available and suitable for certain critical uses, such specialized designs cannot compete for consideration in lesser industrial or agricultural applications or for use in and about the home. Not only must a coupling be inexpensive to be fully competitive, it also must be simple to operate because many users are unable or unwilling to read and understand directions for using a device with which they are at all unfamiliar.

A primary object of the present invention is provision of a leakproof hose coupling that is inexpensive to make and that is simple to use. An object is production of a hose coupling requiring only a single manipulation to assemble it to a hose. Another object is production of a hose coupling equally useful as original equipment and as a replacement for faulty hose couplings of other construction. A further object is provision of a hose coupling with readily replaceable sealing means. Other objects of this invention, together with means and methods for attaining the various objects, will be readily apparent from the following description and the accompanying diagrams.

Figure 2:
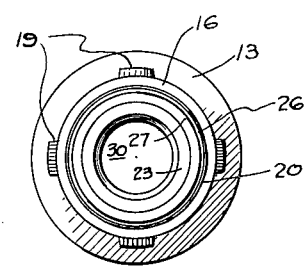
Figure 3:
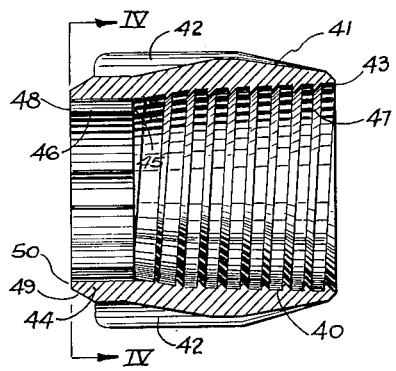
Figure 4:
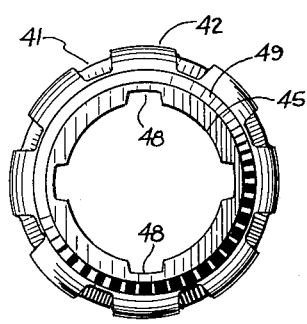
Figure 5:
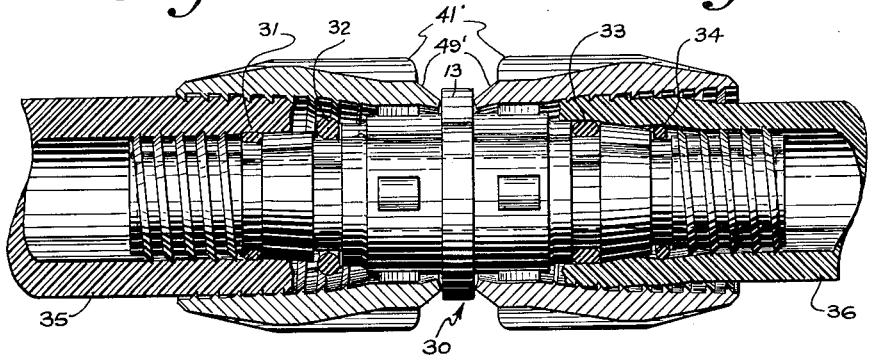

FIG. 1 is a side elevation of a nipple member of a hose coupling of the present invention; FIG. 2 is an end elevation of the same apparatus taken at II—II of FIG. 1; FIG. 3 is a side elevation of a sleeve member of a hose coupling of the present invention, before assembly about the nipple member; FIG. 4 is an end elevation of the apparatus of FIG. 3, taken at IV—IV thereof; and FIG. 5 is a side elevation of a double-ended or "mender" coupling of the present invention comprising the nipple and sleeve members of the preceding views assembled to one another and interconnecting two dissimilar hoses.

In general, the objects of the present invention are accomplished by providing a hose coupling comprising a member in the form of a nipple having a tapering portion and having an externally threaded portion, a member in the form of a counter-tapering sleeve coaxially located about the nipple, the nipple and sleeve having opposite portions thereof similarly threaded and being adapted to receive a hose in wedging engagement therebetween, with a plurality of circumferential grooves in the outer surface of the nipple, adjacent the tapered portion, thereof, and a plurality of resilient annular seals graduated in size and fitting into the grooves, with at least one seal per groove, and with a minor portion of each seal, including substantially the entire peripheral surface thereof, normally protruding outside the surrounding groove.

FIGS. 1 and 2 show in side and end elevation, respectively, nipple member 11. For convenience in description, the nipple may be considered as having base portion 12, which extends from peripheral flange 13 (located at the left in FIG. 1 and broken off there) to groove 15. Intervening between the base and this groove are main cylindrical surface 14, extending from the flange to terminate in shoulder 16, and necked cylindrical portion 17 abutting both the shoulder and the groove. The main cylindrical surface is interrupted at intervals by lugs 19 (four being shown in FIG. 2, and only three visible in FIG. 1) spaced about its periphery and extending longitudinally (i.e., parallel to the axis of the nipple) along part of the surface.

Opposite end portion 21 of the nipple extends from extreme right edge 23 to groove 25 at the left and carries helical thread 27 on its generally cylindrical exterior surface 24 so formed. The thread has a sawtoothed profile with the inclined sidewall of the thread oriented toward the right. Groove 25 is narrower and shallower than previously mentioned groove 15, and the base of groove 25 is nearer than the base of groove 15 to the nipple axis. Left sidewall 26 of groove 25 extends radially slightly further than the left edge of thread 27 and is similarly perpendicular to the base of the groove. Tapered cylindrical surface 20 extends from one groove to the other, having its smaller diameter at the right adjoining sidewall 26 of groove 25. Bore 30 of the nipple extends completely through it from flange 13 at the left to edge 23 at the right.

FIGS. 3 and 4 show sleeve member 41 in side and end elevation, respectively. Over a major portion of its length the generally cylindrical exterior of the sleeve carries longitudinal flanges or ribs 42 (eight being visible in FIG. 4 and only two in FIG. 3) useful both as structural reinforcement and as an aid to manipulation of the coupling as discussed below. The interior of the sleeve is tapered from wider inside end 43 to an inside step forming the right or inner edge 45 of collar 46, which extends from the step to outer edge 50 at the other end or base 44 of the sleeve. Thread 47 on tapered inner wall 40 has a sawtooth profile with the inclined sidewall of the thread oriented toward the more open end of the sleeve (at the right in FIG. 3). The inside wall of the mentioned collar is interrupted at intervals by longitudinal slots 48 (four shown in FIG. 4) extending for the full length of the collar from the step leftward to the outer edge of the base. Exterior peripheral edge surface 49 of the base is chamfered from edge 50 to the ends of ribs 42.

It will be apparent that the sleeve shown in FIGS. 3 and 4 can be assembled coaxially about the nipple shown in the preceding views. When the members are so assembled, the outer edge of the base of the sleeve abuts flange 13 of the nipple, with the lugs of the nipple located in cooperating engagement with the longitudinal indentations in the sleeve interior. At this stage in the coupling assembly operation, appropriate pressure is applied to the chamfered surface at the base of the sleeve to deform it toward the axis so as to trap the sleeve irremovably about the protruding lugs and adjacent the flange on the nipple. Such pressure may be applied by a suitable encircling clamp (not shown) or the equivalent actuated in any convenient manner, such as hydraulically, pneumatically, or by mechanical linkage, as will be obvious to persons skilled in the art, without necessity for illustration or further description.

FIG. 5 shows in side elevation double-ended or "mender" coupling 30, which comprises identical opposite halves (each like nipple 11) joined at flange 13 and having a pair of identical sleeves assembled thereon. Each sleeve is like sleeve 41 except that the chamfered edge surface thereof has been necked to retain it on the nipple, as just mentioned; as so changed in position it is designated by a priming of its reference numeral, thus: 49′. The reference numeral for each sleeve is similarly altered (now 41′) because of this slight change in configuration from the previous illustration, whereas the reference numerals for the other parts of the sleeve, as well as for the nipple, remain unchanged in conformity with the lack of change in the parts so designated.

Added in FIG. 5 are resilient annular sealing rings 31, 32, 33, and 34 of the so-called "O-ring" type. O-rings 31 and 34, located at the extreme left and right, respectively, are smaller in both internal (or open) diameter and transverse (or solid) diameter than rings 32 and 33. The smaller rings fit in narrower and shallower grooves 25, whereas the larger ones fit in wider and deeper grooves 15. It is apparent that normally each ring fits somewhat more than halfway into its surrounding groove, with its inner edge in contact with the base of the groove and with its entire peripheral surface exposed between the surface of the nipple and the inside wall of the sleeve.

Also added in FIG. 5 are hoses 35 and 36 at the left and right, respectively. Each hose is wedged between the corresponding nipple and sleeve, and the threads on the respective members are engaged with the hose walls. Left hose 35 has a relatively thick wall and relatively small inside diameter, as compared with right hose 36. Hose 35 accordingly reaches only tapered portion 20 past left O-ring 31 before wedging tightly between the nipple and the surrounding sleeve; in so doing, it compresses only that leftmost O-ring by sealing contact with the peripheral surface thereof. Hose 36, on the other hand, reaches beyond the tapered portion and onto cylindrical surface 17 of the right nipple before becoming tightly wedged between that nipple and its surrounding sleeve; this hose is large enough inside that it hardly compresses smaller O-ring 34, but does compress larger O-ring 33 sufficiently to seal against the ring's peripheral surface. This view clearly illustrates the adaptability of a hose coupling of the present invention to leakproof interconnection of hoses of different diameters and thicknesses, for example.

A hose is assembled readily to a coupling of this invention by taking the hose in one hand, and the ribbed outer surface of the coupling in the other hand, and then rotating the hose or the coupling (or both oppositely to one another) to "thread" and wedge the end of the hose in between the nipple and sleeve of the coupling. An effective and convenient taper for either or both of the members is on the order of a couple of degrees, while the required amount of rotative manipulation is dependent upon the degree of taper and also upon the hose composition and the pitch of the engaged threading (pitch of 10 ±4 threads per inch having been found generally satisfactory). In connection of two hoses to one another with a double-ended coupling, as in FIG. 5, the simple assembly process just described is duplicated with each hose at each end of the coupling. In the illustrated embodiment, the sleeve and nipple are splined to one another by the lugs on the nipple and the cooperating indentations on the sleeve, and they preferably are threaded similarly to one another, so that they readily rotate together (i.e., as a unit) into and onto the hose being assembled thereto and grip it securely. The taper of a portion of either of the members, preferably an appreciable counter-taper of both, together with the threading, permits the hose to be wedged tightly in place therebetween with relatively little effort.

It is apparent that the coupling can be made in a range of sizes for use with hoses differing widely in size from those accommodated by a single coupling. Of course, one end of the illustrated double-ended coupling can be replaced by a conventional internally or externally threaded member suitable for attaching it to a pipe, spigot, or other male member, or to a hose nozzle, sleeve, or other female member. Alternatively, the coupling can terminate at that end in a suitable unthreaded type of press-fit or snap-on member, if desired. As such terminations at the flange of the nipple shown in FIGS. 1 and 2 do not affect the inventive elements present therein, they are not illustrated and will not be discussed further in this description of the invention, except to say that they can be formed integrally with, or separate from and then assembled to, the claimed coupling in any suitable construction.

As pressure is applied to the inside of the hose by fluid contained therein the hose will swell slightly and tend to bulge away from the nipple. However, the surrounding sleeve retains the hose in place, and the illustrated preferred threading of the sleeve wall indents the outer wall of the hose and holds on to it. Equivalent threadlike or similarly operative retaining means may be substituted on the inside wall of the sleeve for this purpose or, for that matter, on the corresponding portion of the nipple to aid assembly and retention on the hose thereon. The sealing rings are sufficiently resilient that a ring remains in sealing contact with the inside wall of the hose at all times after proper assembly of the hose to the coupling, thereby ensuring a leakproof connection thereto.

No special materials or techniques are required in the construction of the coupling of this invention. Both the nipple and sleeve members may be made of aluminum, brass, steel, zinc, or any of many other suitable metals, or of ceramic or suitably strong plastic materials, for example. These members may be formed by casting, molding, sintering, or similar operation and may be machined as and if desired. No substantial difficulty is involved in forming the desired contour, including taper and threading or the equivalent, using materials and techniques now customary or available, as will be readily apparent.

An effective method of assembling the sleeve irremovably on the nipple has been suggested above, and any other suitable manner of doing so may be employed instead. As indicated, it is greatly preferred that the sleeve and nipple fit in essentially fixed relationship to one another to aid assembly of the coupling to the hose by a single manipulation thereof; the actual means employed for that purpose may depart from that illustrated and described herein. Furthermore, instead of being retained irremovably on the nipple, the sleeve as produced may be provided with one or more set screws or the like through its sidewall to engage the nipple; such a modification, though more costly, may be useful (e.g., in certain industrial or agricultural applications) to facilitate replacement of sealing rings by ready disassembly of the sleeve from the nipple.

The annular seals may be produced in ring form by molding, extrusion and cutting, or other technique from natural or synthetic rubber or other suitable elastomer, such as halogenated hydrocarbons useful as sealing means, or similarly resilient materials. They may have the circular solid section characteristic of the conventional O-ring, which is perhaps the most economical construction, or they may have a rectangular or other cross section as may be desired. The O-ring or similar seal is dimensioned to fit not too loosely in the surrounding groove on the nipple so as to allow adequate, but not excessive, room for expansion into the groove as the exposed peripheral sealing surface is engaged and compressed by the inside wall of the hose. The seal should fit as least halfway, and preferably somewhat more, down into the groove so as to prevent it from being dislodged when the hose is forced onto the nipple. More than one seal may be used in a groove, if desired, either identical with one another or preferably graduated in size, being larger at increasing distance from the small end of the nipple.

As only the annular seals are subject to wear, the coupling of this invention is useful indefinitely unless physically abused. If after repeated coupling and decoupling a sealing ring is found to be abraded or otherwise deteriorated, it can be removed readily and replaced without difficulty at a cost that is trivial, even as compared with the modest initial cost of the coupling itself. If desired, the nipple can be grooved to accommodate three or more sealing rings; in general, the more rings (graduated in size, in accordance with taper of the surfaces adjacent the grooves) on the nipple, the greater the range of adaptability to hoses of various sizes. While for some applications a single sealing ring may suffice, it obviously is incapable of providing the range of accommodation provided by two or more rings, as suggested above.

The illustrated embodiment of hose coupling has proved quite satisfactory in use upon a great variety of hoses; however, the illustration thereof and description directed thereto are not intended to preclude adaptations or modifications within the scope of the invention as claimed. Some minor variations have been suggested above. In addition, the ribbed contour of the sleeve exterior (which presents a particularly pleasing appearance) may be replaced by a more regular surface, preferably one that is knurled or suitably coated, for example, to facilitate manipulation of the coupling. Further modifications not involving a departure from the claimed invention may come to the mind of a person skilled in this art.

The claimed invention:

1. Hose coupling comprising a hollow member in the form of a nipple having a tapered portion and having a portion threaded externally, the threaded portion having at least one side thereof inclined, with the inclined side of the thread oriented toward the end to which the nipple tapers, the nipple having a pair of circumferential grooves flanking the tapered portion, the groove adjacent the smaller end of the tapered portion being narrow and shallow and the groove adjacent the larger end of the tapered portion being wide and deep relative to one another, a first resilient O-ring fitting in the first groove and a second resilient O-ring fitting in the second groove, the peripheral portion of each O-ring normally protruding for a minor part of its transverse dimension outside the surrounding groove, and a hollow member in the form of a sleeve retained coaxially about the portions of the nipple flanking and intermediate the grooved portions thereof and the O-rings therein, the sleeve having its inside wall tapered outwardly toward a larger diameter in the vicinity of the portion of the nipple tapered toward a smaller diameter, the sleeve also being threaded internally similarly to the external threading of the nipple.

2. The apparatus of claim 1 including retaining means intervening between the nipple and sleeve members, the means being located on at least one of the members and retained thereby, the means also being adapted to retain the other of the members in coaxial relationship therewith.

3. The apparatus of claim 2 wherein the retaining means comprises a plurality of protrusions on the large end of the nipple, and the sleeve has a plurality of indentations on its inside wall in cooperative relationship therewith and has a reduced diameter at one end adjacent the indentations and the cooperating protrusions, whereby the sleeve is retained in essentially non-rotative relationship relative to the nipple.

References Cited in the file of this patent

UNITED STATES PATENTS

| | | |
|---|---|---|
| 735,401 | McFall | Aug. 4, 1903 |
| 786,507 | Mann | Apr. 4, 1905 |
| 863,745 | Nelson et al. | Aug. 20, 1907 |
| 1,195,433 | Bailey | Aug. 22, 1916 |
| 1,486,421 | Dyer | Mar. 11, 1924 |
| 2,025,067 | Miller | Dec. 24, 1935 |
| 2,410,600 | Cowles | Nov. 5, 1946 |
| 2,472,455 | Ansingh | June 7, 1949 |
| 2,485,497 | Lemley | Oct. 18, 1949 |
| 2,485,976 | Main | Oct. 25, 1949 |
| 2,653,791 | Mueller | Sept. 29, 1953 |
| 2,749,150 | Kaiser | June 5, 1956 |
| 2,782,059 | Stranberg | Feb. 19, 1957 |
| 2,506,494 | Feiler | May 2, 1959 |

FOREIGN PATENTS

| | | |
|---|---|---|
| 715,034 | Great Britain | Sept. 8, 1954 |
| 816,661 | Great Britain | May 21, 1959 |

UNITED STATES PATENT OFFICE
CERTIFICATE OF CORRECTION

Patent No. 3,032,358

May 1, 1962

Kenneth P. Rolston

It is hereby certified that error appears in the above numbered patent requiring correction and that the said Letters Patent should read as corrected below.

Column 2, line 5, for "opposite" read -- opposing --; line 9, for "portion," read -- portion --; column 4, line 34, for "on" read -- of --; column 5, line 6, for "as" read -- at --; column 6, line 50, for "816,661" read -- 813,661 --.

Signed and sealed this 21st day of August 1962.

(SEAL)
Attest:

ESTON G. JOHNSON

Attesting Officer

DAVID L. LADD

Commissioner of Patents